United States Patent [19]

Holme

[11] Patent Number: 4,541,286
[45] Date of Patent: Sep. 17, 1985

[54] GAS PRESSURE MEASURING CIRCUIT

[76] Inventor: Alan E. Holme, 1 Hilary Close, Polegate, East Sussex, England

[21] Appl. No.: 411,063

[22] Filed: Aug. 24, 1982

[30] Foreign Application Priority Data

Aug. 28, 1981 [GB] United Kingdom ............... 8126395

[51] Int. Cl.$^4$ ............................................. G01L 21/12
[52] U.S. Cl. ........................................ 73/755; 73/708
[58] Field of Search .................. 73/755, 708; 324/105

[56] References Cited

U.S. PATENT DOCUMENTS 3,216,249 11/1965 Joel ...................................... 73/755
3,368,407 2/1968 Orr, Jr. et al. ....................... 73/755

OTHER PUBLICATIONS

J. English et al., "A Wide Range Constant-Resistance Pirani Gauge with Ambient Temperature Compensation", J. Sci. Instrum., 1965, vol. 42, pp. 77–80.
A. Onol, "A Simple Constant-Resistance Termistor Pirani Gauge", J. Phys. E. Sci. Instrum., vol. 11, 1978, pp. 294–295.

Primary Examiner—Donald O. Woodiel
Attorney, Agent, or Firm—David A. Draegert; Larry R. Cassett

[57] ABSTRACT

In a circuit for controlling the temperature of a filament in a Pirani gauge head, secondary temperature compensation is provided by mounting an auxiliary resistor adjacent the temperature-compensating arm of a bridge. The auxiliary resistor forms part of a potential divider which provides a preset offset voltage to an associated output amplifier. This offset voltage is added algebraically to the variable voltage driving the bridge circuit so as to provide additional temperature compensation.

8 Claims, 1 Drawing Figure

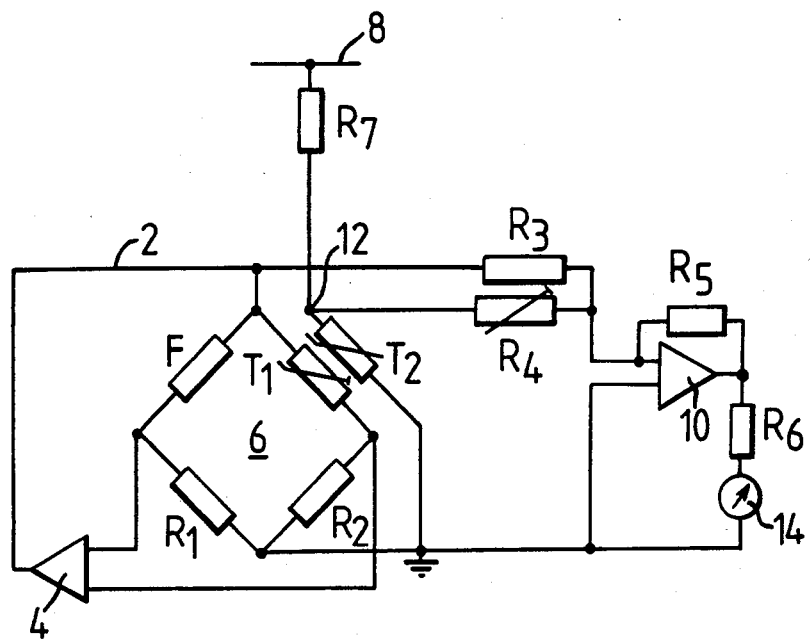

GAS PRESSURE MEASURING CIRCUIT

The present invention relates to a measuring circuit for a Pirani gauge. Such gauges are used for measuring the pressure of a gas by means of a heated filament of which the temperature is measured in terms of its electrical resistance. The temperature of the filament, or the rate at which it loses heat to its surroundings, is a function of the gas pressure, and hence either of these factors may be used to permit the gauge to measure vacuum.

In a Pirani gauge, the filament is in one arm of a Wheatstone bridge circuit. The gauge may be operated in either a constant temperature or a constant voltage mode. In the former mode, the rate at which energy is supplied to keep the filament at a constant temperature is varied with changes in gas pressure, and hence this rate of change acts as a measure of the degree of vacuum. In the latter mode, the variation with gas pressure in the electrical imbalance of the bridge acts as a measure of the degree of vacuum.

The measuring circuit of the present invention is designed to operate in the constant temperature mode.

In known Pirani gauges, some degree of temperature compensation is provided by putting a temperature-dependent resistor in another arm of the bridge. The resistance variations with temperature which this produces apply throughout the whole of the normal temperature range of operation of the gauge, which is usually 10° to 50° C., but complete compensation can be effected only at one temperatuure, which is arranged to be at one end of the scale.

The present invention according to its broadest aspect, provides a circuit for operating a Pirani gauge comprising an electrical bridge which has one arm adapted to receive the gauge and which is arranged to produce an output signal representative of gas pressure within the gauge, electrical means not embodied within an arm of the bridge and effective to produce a signal indicative of the ambient temperature in which the gauge operates together with signal translation means responsive to the output of the bridge and of the electrical means and capable of producing a gas pressure signal compensated for ambient temperature changes.

Conveniently the electrical means comprise a resistive element which preferably forms part of an electrical network such as a potential divider across which a substantially constant potential difference is applied. The potential appearing at a tap of the divider suitably is, together with the signal from the bridge, applied to the input of an amplifier whose output can be used to provide an indication of temperature compensated gas pressure.

In a preferred embodiment of the invention a degree of temperature compensation additionally is provided by a resistive element embodied in one arm of the bridge.

An embodiment of the invention will now be described by way of example with reference to the accompanying drawing which is a schematic diagram of a circuit for a Pirani gauge.

Referring to the drawing, the resistor F is the Pirani gauge filament which is to be heated by current drawn from a variable voltage rail 2 drawing its power from the output of an amplifier 4. The balancing arm of the bridge 6 includes a primary temperature-compensating resistor T1. The other two ratio arms of the bridge 6 are provided by resistors R1 and R2.

Situated adjacent to resistor T1 is a resistor T2 providing the improved temperature compensation. It is adjacent to resistor T1 in order to be subjected to the same temperature changes as that resistor. Resistor T2 is connected to a constant voltage rail 8 through a resistor R7. Because the other side of resistor T2 is connected to earth, resistors R7 and T2 form a potential divider, the mid-point of which is coupled through a preset resistor R4 to the input of a second amplifier 10 which is bridged by resistor R5. The variable voltage rail 2 is connected through resistor R3 to the same input of the amplifier. In this way, the variations in the voltage of point 12 caused by fluctuations in the resistance of resistor T2, lead to a voltage being added algebraically to that at the outlet of resistor R3, so as to produce the desired offset in the effective voltage of rail 2. This offset voltage is amplified by amplifier 10 and fed through a resistor R6 to a meter 14 which is calibrated in terms of gas pressure.

By virtue of the connection of the respective diagonal of bridge 6 across the inlets of amplifier 4, the signal in rail 2 varies as a function of the value of the resistance of filament F, with the voltage applied across the signal diagonal of bridge 6 being designed to keep this resistance, and therefore the temperature of filament F, constant.

The primary compensating resistor T1 can be preset, as illustrated, so that it exactly compensates for other variations at one point in the operating temperature range of the associated Pirani gauge. As the temperature of the secondary compensating resistor T2 varies in operation of the guage, the offset voltage fed through resistor R4 has its amplitude controlled by presetting R4 at a chosen temperature. It has been found that the characteristics of resistors T1 and T2 complement each other to a large extent so that the resultant circuit indicates the measured gas pressure more accurately over the normal range of operating temperature.

What we claim is:

1. A circuit for operating a Pirani gauge comprising,
   an electrical bridge which has one arm adapted to receive the gauge and which is arranged to produce an electrical output signal representative of gas pressure within the gauge,
   a temperature-sensitive resistive device in an arm of the bridge for providing temperature compensation of the output of the bridge,
   temperature sensing electrical means not embodied within an arm of the bridge and effective to produce an electrical signal indicative of the ambient temperature in which the gauge operates, and
   signal translation means electrically connected to and responsive to the output of the bridge and to the signal from the electrical means and capable of producing a gas pressure signal compensated for ambient temperature changes.

2. A circuit as claimed in claim 1 wherein the Pirani gauge is arranged to operate in a constant filament temperature mode.

3. A circuit as claimed in claim 2 wherein the electrical means comprise a temperature-sensitive, resistive device.

4. A circuit as claimed in claim 3 wherein the resistive device forms part of a network and is effective to produce from a potential difference applied across the network a signal responsive to temperature change.

5. A circuit as claimed in claim 4 wherein the resistive device forms part of a potential divider.

6. A circuit as claimed in claim 5 wherein the signal from a tap of the divider and the bridge output signal are applied to the input of an amplifier whose output can be used to provide representatives of temperature-compensated gas pressure.

7. A circuit as claimed in any preceding claim wherein both resistive elements are proximate.

8. A circuit for operating a Pirani gauge comprising,
an electrical bridge which has one arm adapted to receive the gauge and which is arranged to produce an electrical output signal representative of gas pressure within the gauge,
a temperature-sensitive resistive device in an arm of the bridge for providing temperature compensation of the output of the bridge,
a potential divider, comprising a tap and a temperature sensitive resistive device, not embodied within an arm of the bridge and effective to produce from a potential difference applied across the divider a signal indicative of the ambient temperature in which the gauge operates, and
an amplifier responsive to the output of the bridge and to the signal from the tap and capable of producing a gas pressure signal compensated for ambient temperature changes.

* * * * *